310-322
4/27/82 XR 4,326,418 SR

United States Patent [19]

Pell, Jr.

[11] 4,326,418

[45] Apr. 27, 1982

[54] ACOUSTIC IMPEDANCE MATCHING DEVICE

[75] Inventor: James W. Pell, Jr., El Toro, Calif.

[73] Assignee: North American Philips Corporation, New York, N.Y.

[21] Appl. No.: 137,675

[22] Filed: Apr. 7, 1980

[51] Int. Cl.[3] ........ G01N 29/00

[52] U.S. Cl. ........ 73/644; 310/322

[58] Field of Search ........ 73/644, 632, 626; 310/322, 328, 334–336

[56] References Cited

U.S. PATENT DOCUMENTS

| | | | |
|---|---|---|---|
| 3,663,842 | 5/1972 | Miller | 73/644 |
| 3,971,962 | 7/1976 | Green | 310/322 |
| 4,101,795 | 7/1978 | Fukumoto et al. | 310/336 |
| 4,153,894 | 5/1979 | Alphonse et al. | 73/644 |
| 4,211,948 | 7/1980 | Smith et al. | 73/644 |

*Primary Examiner*—Stephen A. Kreitman
*Attorney, Agent, or Firm*—Jack E. Haken

[57] ABSTRACT

An impedance matching window for an ultrasound transducer comprises a periodic array of stepped structures. Each stepped structure comprises a plurality of parallel matching strips disposed side-by-side on an active surface of a piezoelectric ceramic.

44 Claims, 5 Drawing Figures

ACOUSTIC IMPEDANCE MATCHING DEVICE

The invention relates to apparatus for transmitting acoustic energy. More specifically the invention relates to a structure for matching the impedance of acoustic transducers to the impedance of a test object. Typically, an array of such transducers is used in medical diagnostic imaging and the test object comprises animal tissue.

BACKGROUND OF THE INVENTION

Echo ultrasound techniques are a popular modality for imaging structures within the human body. One or more ultrasound transducers are utilized to project ultrasound energy into the body. The energy is reflected from impedance discontinuities associated with organ boundaries and other structures within the body; the resultant echos are detected by one or more ultrasound transducers (which may be the same transducers used to transmit the energy). Detected echo signals are processed, using well known techniques, to produce images of the body structures. In one such technique, a narrow beam of ultrasound is scanned across the body to provide image information in a body plane.

A beam of ultrasound may be scanned across a body by sequentially activating individual ultrasound transducer elements in a linear array of such elements. Apparatus of this type is described, for example, in the article *Medical Ultrasound Imaging: An Overview of Principles and Instrumentation,* J. F. Havlice and J. C. Taenzer, Proceedings of the IEEE, Vol. 67, No. 4, April 1979, pg. 620 and in the article *Methods and Terminology for Diagnostic Ultrasound Imaging Systems,* M. G. Maginness, pg. 641 of the same publication. Those articles are incorporated by reference herein as background material.

Efficient coupling of ultrasound energy from a transducer or array of transducers to a body or other object undergoing examination requires that the acoustic impedance of the transducer be matched to that of the test object. Ultrasound transducers typically used in medical applications comprise ceramics having an acoustic impedance of approximately $30\times10^6$ kg/M$^2$ sec. Human tissue has an acoustic impedance of approximately $1.5\times10^6$ kg/$M_2$ sec; thus an impedance matching structure is usually required between transducer ceramics and human tissue. Quarterwave matching windows, for example of the type described in my U.S. patent application Ser. No. 104,516, filed on or about Dec. 17, 1979, are commonly used for this purpose.

Wideband ultrasound pulses are typically utilized in medical apparatus. Ideally, an impedance matching structure which couples wideband pulses from the transducer to the human tissue should have a Gaussian frequency response as illustrated in FIG. 1. However, theoretical and experimental studies have shown that if a transducer array is backed with air or a lossy material, a single quarterwave matching window will produce a double peaked frequency response of the type illustrated in FIG. 2. The prior art has recognized that a frequency response characteristic which approaches the ideal Gaussian may be achieved with an impedance matching structure comprising two or more quarterwave matching layers in cascade (that is one overlaying the other). The production of cascade matching structures of this type requires precise control of the matching layer thickness. Although such structures may be produced on experimental transducer arrays which are constructed from precision ground ceramic plates of uniform thickness, they are impractical for economical production transducers, which are generally assembled from cast ceramic plates which may be warped or have varying thickness.

SUMMARY OF THE INVENTION

In accordance with the invention, a plurality of matching strips of different thicknesses are disposed, side by side, on the face of each element in a transducer array. Typically, each of the strips has a thickness of one quarter wavelength at some component frequency of the transmitted ultrasound energy. A single peaked frequency response, which approaches the ideal Gaussian, is thus achieved. The structure is relatively insensitive to minor variations in the thickness of the individual matching strips and may thus be manufactured by inexpensive sawing or pressing techniques.

An impedance matching structure for coupling wideband sonic energy between one or more acoustic transducers and an object in accordance with the invention comprises a periodic array of stepped matching structures disposed side-by-side over an active surface of the transducers, each of the matching structures comprising two or more flat, parallel strips of sound-conductive material disposed, side-by-side, over the active surface in a stepped configuration wherein the thickness of successive strips increases monotonically across the structure.

In a preferred embodiment, the matching strips comprise a periodic array of staircase-like structure disposed across the active face of a transducer array. In a further refinement of the invention the faces of the steps are disposed perpendicular to the scanning axis of the array. Typically, the width and height of strips in the structure vary from one step to the next.

BRIEF DESCRIPTION OF THE DRAWINGS

The invention may be understood by reference to the accompanying drawings in which:

FIG. 3*b* is a detailed view of one corner of the transducer array of FIG. 3*a.

DESCRIPTION OF A PREFERRED EMBODIMENT

Figure 1:
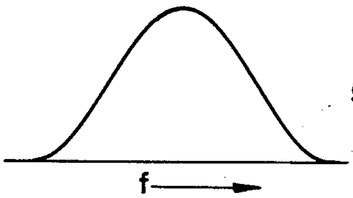
FIG. 1 is an ideal frequency response characteristic for a matching structure.
Figure 2:
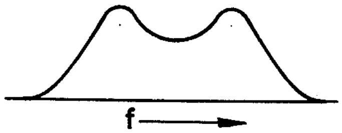
Fig. 2 (PRIOR ART)
FIG. 2 is the frequency response of a single layer matching window of the prior art.
Figure 3A:
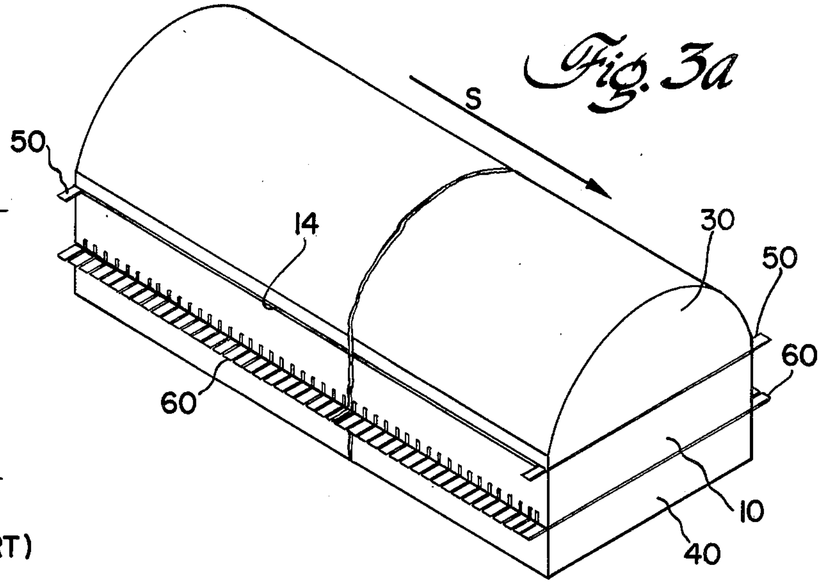
FIG. 3*a* is a transducer array which includes a matching structure of the present invention.
Figure 3B:
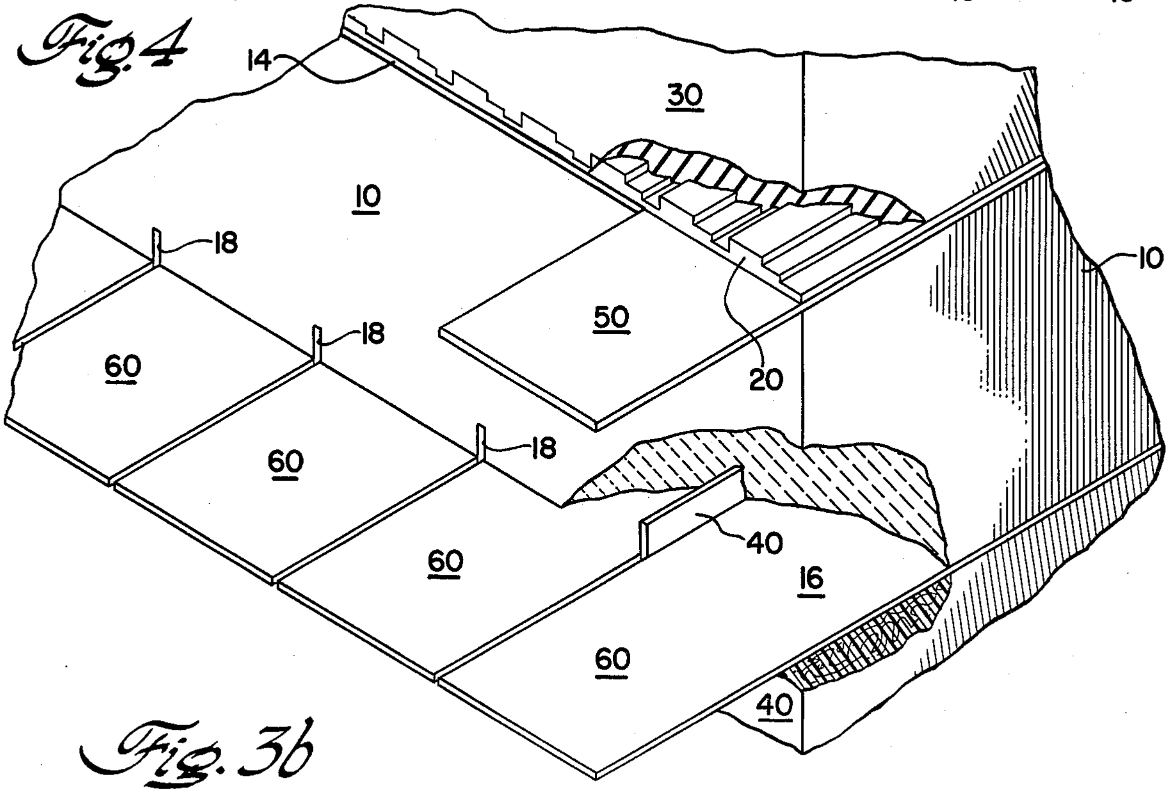

FIGS. 3*a* and 3*b* illustrate a preferred embodiment of the invention which comprises a linear array of transducer elements. The elements are formed from a single rectangular block of piezoelectric ceramic material 10 which may, for example, comprise a type PZT-5 ceramic. For typical medical applications the ceramic block 10 has a thickness resonance of approximately 3.5 MHz. The scanning axis of the array is indicated by arrow S.

The active front surface of the ceramic block 10 is provided with an electrode 14. The back surface of the ceramic block 10 is coated with a copper electrode 16. The individual transducer elements 8 are then separated by sawing a series of parallel slots 18, perpendicular to the scanning axis, on the back surface across the width of the ceramic and copper electrode. A typical transducer array is produced from a ceramic block having a width of 16.9 mm and a length of 97.5 mm, 72 individual transducer elements, each 1.28 mm long, are produced by sawing the bar, through approximately 10% of its thickness, with a series of kerfs using a 0.06 mm diamond saw.

A periodic array of stepped matching structures 20 of sound conductive material is disposed over the front surface of the front electrode 14. In a preferred embodiment (FIG. 4) each matching structure comprises a staircase-like structure of three parallel strips having front surfaces 21, 23 and 25 disposed at varying distances from the surface of the electrode 14. The thickness of the strips (from the surface of the electrode to each of the front surfaces) is chosen to be approximately one quarter wavelength at frequencies within the spectrum of the wideband pulses of ultrasound energy. At least one strip of each thickness should overlay each of the elements 8. It is not necessary, however, that the vertical faces of the steps 22, 24 be aligned with or correspond to the boundaries of the underlying transducer elements 8.

In a preferred embodiment the vertical faces of the steps 22, 24 extend parallel to the saw kerfs 18. Alternately, however, the matching structure may be constructed with the vertical faces perpendicular to the saw kerfs or at an intermediate angle thereto. There is, likewise, no requirement that the width or thickness of the individual strips within each structure be uniform.

Ideally, the acoustic impedance of the matching strips should be the geometric means of the acoustic impedances of the transducer and the test object. In practice the impedance of the matching strips should lie between the impedance of the transducer and that of the test object. In a preferred embodiment the matching structure is formed by casting a flat layer of epoxy resin loaded with tungsten powder on the front surface of the electrodes 14. A series of parallel grooves are then cut in the surface of the resin, using a programmed diamond saw, to produce the periodic staircase structures.

Figure 4:
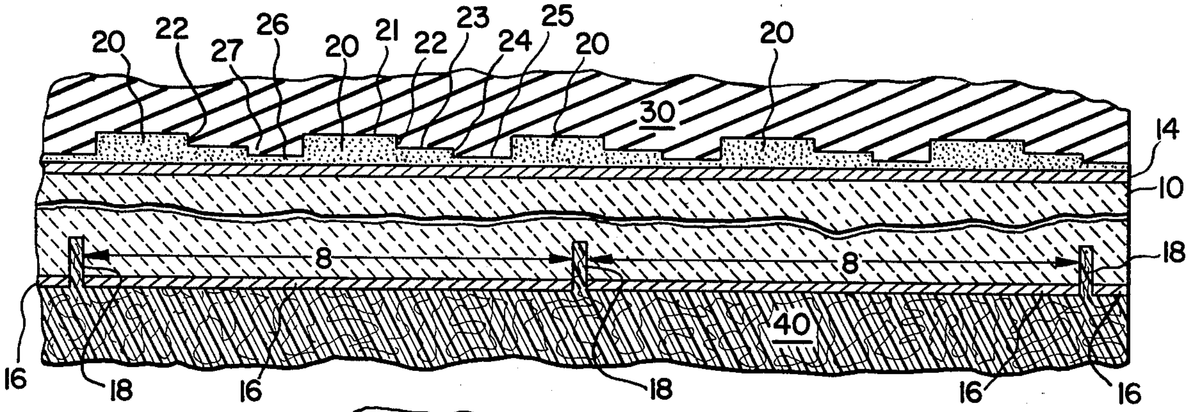
* and FIG. 4 is a detailed section of the matching structure of FIG. 3*a.*

In a preferred embodiment intended for operation at 3.5 MHz (as illustrated in FIG. 4) surface 21 is 0.228 mm long and is disposed approximately 0.102 mm above the front surface of electrode 14; surface 23 is 0.127 mm long and is disposed 0.063 mm above the front surface of electrode 14; and surface 25 is 0.152 mm long and is disposed approximately 0.025 mm above the front surface of electrode 14. In a typical manufacturing environment the tolerance of the surface flatness of the ceramic block 10 and the electrode 14 may be such that the saw cuts used to produce the lowest surface 25 actually expose the underlying electrode 14. The characteristics of the matching structure are such that its frequency response and other operating characteristics are not significantly deteriorated by the occasional absence of the thinnest portion of the matching layer 20 in structures along the array.

The transducers are backed with a lossy air cell 40 (which may for example comprise epoxy resin loaded with glass micro-balloons) which is bonded to the surface of rear electrode 16 and fills the saw kerfs 18. Focussing across the width of the array may be achieved by casting a cylindrical acoustic lens 30 directly over the front of the matching structure. Typically the lens may comprise silicone rubber.

Extensions of the back electrodes 16 on the surface of each transducer may be brought out of the sides of the array as tabs 60. Likewise, an extension of the front electrode 14 may be brought out of the side of the array as tabs 50. In a preferred embodiment, the two end transducer elements of the array are inactive; tabs from the front electrode 50 are folded down to contact the back electrodes on these and elements to provide a ground plane connection.

The matching device has been described herein with respect to preferred embodiments for use with a flat transducer array. Those skilled in the art will recognize, however, that the device is equally useful with curved transducer arrays and with single element transducers.

What is claimed:

1. An impedance matching device for coupling wideband sonic energy between one or more acoustic transducers and an object, comprising:

a periodic array of stepped matching structures disposed side-by-side over an active surface of the transducers, each of the matching structures comprising two or more flat parallel strips of sound-conductive material which are disposed, side-by-side, over the active surface in a stepped configuration wherein the thickness of successive strips increases monotonically across the structure.

2. The device of claim 1 wherein the thickness of each of the parallel strips is one quarter wavelength at a frequency within the bandwidth of the coupled sound energy.

3. The device of claim 1 or 2 wherein the frequency response of the impedance matching device is approximately Gaussian.

4. The device of claim 1 or 2 wherein the transducers have a first acoustic impedance, the object has a second acoustic impedance, and the sound-conductive material has an acoustic impedance intermediate the first acoustic impedance and the second acoustic impedance.

5. The device of claim 4 wherein the sound conductive material has an impedance which is the geometric mean of the first impedance and the second impedance.

6. The device of claim 4 wherein the acoustic transducers comprise a piezoelectric ceramic, the object comprises animal tissue, and the sound conductive material comprises a metal filled plastic resin.

7. The device of claim 6 wherein the sound conductive material comprises tungsten powder in an epoxy resin binder.

8. The device of claim 1 wherein the transducer comprises a linear array of parallel transducer elements.

9. The device of claim 8 wherein the transducer comprises a flat linear array of transducer elements.

10. The device of claim 8 or 9 wherein the strips of the matching structures are disposed parallel to the transducer elements.

11. The device of claim 1 or 2 wherein the widths of the surfaces of adjacent parallel strips are not equal.

12. The device of claim 1 or 2 wherein each stepped matching structure comprises at least three parallel strips and wherein the incremental increase in thickness of adjacent strips varies across the width of the structure.

13. The device of claim 1 or 2 further comprising an acoustic disposed over a surface of the periodic array.

14. The device of claim 13 wherein the acoustic lens is a cylindrical lens.

15. The device of claim 1, 2 or 8 wherein the transducer comprises a flat sheet of piezoelectric material, one surface of the sheet defining a front active surface and further comprising a lossy backing layer disposed over a rear surface of the sheet which is opposite the front active surface.

16. The device of claim 10 wherein the transducer comprises a flat sheet of piezoelectrical material, one surface of the sheet defining a front active surface and further comprising a lossy backing layer disposed over a rear surface of the sheet which is opposite the active surface.

17. The device of claim 12 wherein the transducer comprises a flat sheet of transducer material, one surface of the sheet defining a front active surface and further comprising a lossy backing layer disposed over a rear surface of the sheet which is opposite the active surface.

18. A wide bandwidth acoustic transducer assembly comprising:

a linear array of acoustic transducer elements formed in a sheet of piezoelectric material, the sheet having a front active surface and a rear surface which is opposite the front surface;

a lossy backing layer disposed adjacent the rear surface of the sheet;

matching means includes an array of stepped matching structures disposed side-by-side over the active surface of the sheet, each of the stepped structures comprising two or more flat parallel strips of sound conductive material disposed side-by-side on the active surface in a stepped configuration wherein the thickness of successive strips increases monotonically along the width of the structure.

19. The assembly of claim 18 wherein the rear surface of the sheet is grooved with a series of parallel kerfs to separate the individual transducer elements.

20. The assembly of claim 18 wherein the parallel strips of sound conductive material are disposed parallel to the kerfs.

21. The assembly of claim 19 wherein at least two stepped matching structures are disposed over each transducer element.

22. The assembly of claim 18, 19, 20, or 21 further comprising electrode means for coupling electrical energy to the transducer elements.

23. The assembly of claim 22 wherein the electrode means comprise a first electrode disposed between the active surface of the sheet and the matching means and a plurality of second electrodes, each second electrode being disposed between the rear surface of a transducer element and the backing layer.

24. The assembly of any claims 18, 19, or 20 wherein the matching structures comprise a material having an acoustic impedance intermediate the acoustic impedance of the sheet and the acoustic impedance of human tissue.

25. The assembly of claim 22 wherein the matching structures comprise a material having an acoustic impedance intermediate the acoustic impedance of the sheet and the acoustic impedance of human tissue.

26. The assembly of claim 23 wherein the matching structures comprise a material having an acoustic impedance intermediate the acoustic impedance of the sheet and the acoustic impedance of human tissue.

27. The assembly of any of claims 18 through 21 wherein the matching structure comprises metal powder and a resin binder.

28. The assembly of claim 22 wherein the matching structure comprises metal powder and a resin binder.

29. The assembly of claim 28 wherein the matching structure comprises tungsten powder in an epoxy resin binder.

30. The assembly of claim 22 further comprising an acoustic lens disposed over the matching structure and opposite the sheet.

31. The assembly of claim 30 wherein the acoustic lens comprises silicone rubber.

32. The assembly of claim 18 wherein the piezoelectric material is a PZT-5 ceramic.

33. The assembly of claim 22 wherein the backing layer comprises glass micro-balloons in a resin binder.

34. The assembly of claim 29 wherein the backing layer comprises glass micro-balloons in a resin binder.

35. The assembly of claim 18 wherein the thickness of each of the parallel strips is a quarter wavelength at a frequency within the bandwidth of energy produced or received by the transducer assembly.

36. The assembly of claim 18 wherein the widths of adjacent strips are not equal to each other.

37. The assembly of claim 18 wherein each structure comprises three strips.

38. The assembly of claim 37 wherein the widths of adjacent strips in the structure are in the ratio of 0.228:0.127:0.152.

39. The assembly of claim 28 wherein the thickness of adjacent strips in the structure are in the approximate ratio of 0.102:0.063:0.025.

40. The assembly of claim 39 wherein approximately two and one-half matching structure are disposed over each transducer element.

41. The assembly of claim 18 wherein the array of stepped matching structures is a periodic array.

42. An impedance matching device for coupling wideband sonic energy between an active surface of a first material and a second material, comprising two or more flat parallel strips of sound conductive material disposed side-by-side over the active surface, the thickness of each of the strips being one quarter wavelength some frequency component of the sonic energy and the thickness of adjacent strips being different from each other.

43. The device of claim 42 wherein the first material forms an ultrasound transducer.

44. The device of claim 42 or 43 wherein the acoustic impedance of the strips is intermediate the acoustic impedance of the first material and the acoustic impedance of the second material.

* * * * *